United States Patent [19]

Choby, Jr.

[11] 3,985,587

[45] Oct. 12, 1976

[54] PHOSPHORIC ACID SOLDERING FLUX

[75] Inventor: Edward G. Choby, Jr., Pittsburgh, Pa.

[73] Assignee: Allegheny Ludlum Industries, Inc., Pittsburgh, Pa.

[22] Filed: Dec. 23, 1974

[21] Appl. No.: 535,765

[52] U.S. Cl. .................................. 148/23; 148/24
[51] Int. Cl.² ........................................ B23K 35/24
[58] Field of Search .............................. 148/22–26

[56] References Cited
UNITED STATES PATENTS

| | | | |
|---|---|---|---|
| 2,987,817 | 6/1961 | Kozlik | 148/26 |
| 3,486,948 | 12/1969 | Laubmeyer | 148/24 |
| 3,589,952 | 6/1971 | Burne | 148/24 |
| 3,597,285 | 8/1971 | Aronberg | 148/26 |
| 3,660,127 | 5/1972 | Aronberg | 148/26 |
| 3,814,638 | 6/1974 | Jordan | 148/23 |
| 3,865,641 | 2/1975 | Aronberg | 148/26 |

*Primary Examiner*—Peter D. Rosenberg
*Attorney, Agent, or Firm*—Vincent G. Gioia; Robert F. Dropkin

[57] ABSTRACT

A phosphoric acid flux with good fluxing efficiency and high viscosity, and one which is especially suitable for use in the soldering of copper, stainless steel and copper-plated stainless steel. The flux is in the form of a viscous fluid, or a thermally unstable emulsion when the fluid is combined with a pasty vehicle. The viscous fluid contains phosphoric acid, copper containing material and an organic material (molecular weight between 4,000 and 20,000) from the group consisting of polyethers and polyimines or mixtures thereof having an atomic ratio of carbon to ether oxygen plus imine nitrogen between 1.5 and 3.1.

18 Claims, No Drawings

PHOSPHORIC ACID SOLDERING FLUX

The present invention relates to a soldering flux and, more particularly, to a soldering flux especially suitable for use in the soldering of copper, stainless steel, and copper-plated stainless steel.

Although phosphoric acid is an excellent soldering flux for copper and copper-plated stainless steel, it has not been generally accepted by the plumbing trade because of its low viscosity. Attempts to overcome the viscosity problem by blending petrolatum and other pasty vehicles with the phosphoric acid failed to produce a suitable flux. The pasty vehicle improved texture but reduced the fluxing efficiency of the flux. A further attempt to produce a suitable flux by blending less petrolatum and more phosphoric acid also proved ineffectual. The resulting flux was an unstable emulsion, one in which the acid separated from the petrolatum.

The present invention overcomes the heretofore referred to shortcoming of phosphoric acid fluxes by providing one with good fluxing efficiency and high viscosity; one which contains additions of copper and organic material. The copper increases fluxing power and the organic material increases the flux's viscosity at both room and soldering temperatures. The organic material has a molecular weight between 4,000 and 20,000 and is soluble or miscible with phosphoric acid. It is a material from the group consisting of polyethers and polyimines or mixtures thereof having an atomic ratio of carbon to ether oxygen plus imine nitrogen between 1.5 and 3.1.

U.S. Pat. No. 3,597,285 describes a flux having copper and phosphoric acid, and one to which surfactants and wetting agents can be added. Unlike the present invention it does not add organic material to increase viscosity. In fact, its surfactants can have a molecular weight as low as 1200. The organic material of the subject flux has a molecular weight between 4,000 and 20,000.

It is accordingly an object of the present invention to provide a phosphoric acid flux having good fluxing efficiency and high viscosity.

The flux of this invention can take the form of a viscous fluid or a thermally unstable emulsion. The emulsion results when the viscous fluid is combined with a pasty vehicle to form a mixture having from 30 to 70%, by weight, of pasty vehicle. In weight percent, the viscous fluid consists essentially of 25 to 80% phosphoric acid (based on a concentration of 75 to 95%), 15 to 65% of organic material from the group consisting of polyethers and polyimines or mixtures thereof having an atomic ratio of carbon to ether oxygen plus imine nitrogen between 1.5 and 3.1, from 0.1 to 15% of copper containing material, from 0 to 40% of ammonium salt, and from 0 to 30% water. The molecular weight of the organic material is between 4,000 and 20,000. For purposes of definition, ether or imine functionalities which are present as branches to the main polymer chain (as the methoxyl groups in a methylated glucoside) are counted. All of the carbon atoms in the molecule are counted, but oxygen or nitrogen which is not present as ether or imine linkages is not counted.

Phosphoric acid is present in the viscous fluid in an amount of from 25 to 80% and preferably 30 to 75%, based upon the use of 75 to 95% phosphoric acid. If the concentration is too low, the resulting mixture will be either a solid or a gum, and hence not conducive for application to the surface to be soldered. Too high a concentration of phosphoric acid results in a mixture which is too fluid to remain in the joint at soldering temperature.

The molecular weight of the organic material is between 4,000 and 20,000, and preferably between 6,000 and 10,000. Organic materials with too low a molecular weight are not capable of providing the fluid with sufficient viscosity and uniformity. On the other hand, organic materials with too high a molecular weight will yield a flux with too high a viscosity to adequately flow. Typical organic materials which satisfy the criteria of the present invention are polyethylene glycol, polypropylene glycol, methyl cellulose and polyethyleneimine. Depending upon the molecular weight of the organic material various amounts of water can be added to the flux. For higher molecular weight organic materials, we have reason to believe that up to 30% water can be added. Water levels are, however, preferably limited to the water present in the phosphoric acid. As a result thereof, they are generally below 20%. The preferred level of organic material is from 20 to 60%.

Copper containing material is present in the viscous fluid in an amount of from 0.1 to 15% and preferably in an amount of from 0.5 to 10%. The copper containing material is an aid to soldering. A copper deposit has been observed on stainless steel samples to which the flux has been applied and heated. Typical copper containing materials are metallic copper, copper alloys and copper salts.

Ammonium salts can be present in the viscous fluid in amounts of from 0 to 40%. They appear to extend the time at which joints can be heated before the flux loses its activity. As a general rule they are present in amounts of less than 33%. Amounts of from 15 to 25% have been found most useful.

A pasty vehicle can be added to the viscous fluid to turn it into a thermally unstable emulsion. Users of the flux usually find the texture of the emulsion more desirable to work with. At soldering temperatures, the emulsion breaks and separates into components. Typical pasty vehicles are petrolatum, animal fats and hydrogenated vegetable and nut oils. As a general rule the mixture should have at least 30%, by weight, of a pasty vehicle. Levels in excess of 70% can result in too stable an emulsion and poor wetting of the surfaces to be soldered. A preferred range is from 33 to 40%. The emulsified flux of this invention can accommodate greater percentages of phosphoric acid than could previously known phosphoric acid-pasty vehicle fluxes, as the organic material described hereinabove is included therein.

The present invention also envisions additions of wetting agents and dyes. Such additions are not, however, necessary for the attainment of the desired properties.

A copper-free version of the flux described herein is disclosed in Application Ser. No. 535,744. Application Ser. No. 535,744 was filed on Dec. 23, 1974.

The following examples are illustrative of several aspects of the invention. As stated hereinabove the soldering flux described herein is especially suitable for use in the soldering of copper, stainless steel and copper-plated stainless steel.

EXAMPLE I.

The following were mixed together in order to form a flux:

2.9 gm Basic copper carbonate
2.0 gm Diammonium phosphate
15.8 gm Polyethylene glycol (MW-6000)
52.7 gm Phosphoric acid (85%)
37.0 gm Petrolatum The mixture contained 66.8% viscous fluid and 33.2% pasty vehicle. It was heated to 150° F and stirred while it cooled to 120° F. From 120° F it was allowed to cool without further stirring.

A ¾ inch diameter T439 stainless steel tube was joined to a copper sleeve fitting using the flux described in the preceding paragraph and 50 Pb/50 Sn solder. A water tight joint was produced.

A second flux was prepared in the same manner as was the first. Its composition was the same as the first with the exception that polyethylene glycol with a molecular weight of 1,540 was used instead of polyethylene glycol with a molecular weight of 6,000. The second flux was placed in a jar as was the first. The surfaces of both fluxes were disturbed by scraping and the jars were subsequently placed on their sides. After 1 day some chemical separation was noticeable in the jar containing the second flux. After one month no indication of separation was noticeable in the jar containing the first flux. Significantly, the second flux contained organic material with a molecular weight below 4,000, while the first flux contained organic material with a molecular weight in excess of 4,000. The present invention, as stated hereinabove, specifically requires organic material with a molecular weight between 4,000 and 20,000.

EXAMPLE II.

The following were mixed together in order to form a flux:
12 gm Basic copper carbonate
37 gm Mono-ammonium phosphate
39 gm Polyethylene glycol (MW-6000)
105 gm Phosphoric acid (75%)

The mixture was heated to 170° F, stirred and allowed to cool.

The resulting viscous fluid and 50 Pb/50 Sn solder were used to join ¾ inch stainless steel tubes and copper sleeves. Water tight joints were produced. Note that the fluid contained 19.2% of ammonium salt. Flux activity was excellent.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

I claim:

1. A viscous fluid suitable for use as a soldering flux; said fluid consisting essentially of, in weight percent, 25 to 80% phosphoric acid (based on a concentration of 75 to 95%), 15 to 65% of organic material selected from the group consisting of polyethers and polyimines and mixtures thereof having an atomic ratio of carbon to ether oxygen plus imine nitrogen between 1.5 and 3.1, from 0.1 to 15% of copper containing material, from 0 to 40% of ammonium salt, and from 0 to 30% water; said organic material having a molecular weight between 4,000 and 20,000.

2. A viscous fluid according to claim 1, having 30 to 75% phosphoric acid, 20 to 60% organic material, from 0.5 to 10% of copper containing material, from 0 to 33% of ammonium salt, and from 0 to 20% water.

3. A viscous fluid according to claim 2, having from 15 to 25% of ammonium salt.

4. A viscous fluid according to claim 1, wherein said organic material has a molecular weight between 6,000 and 10,000.

5. A viscous fluid according to claim 1, wherein said organic material is from the group consisting of polyethylene glycol, polypropylene glycol, methyl cellulose and polyethyleneimine.

6. A viscous material according to claim 5, wherein said organic material is polyethylene glycol.

7. A viscous fluid according to claim 1, wherein said copper containing material is from the group consisting of copper, copper alloys and copper salts.

8. A viscous fluid according to claim 7, wherein said copper containing material is basic copper carbonate.

9. A soldering flux consisting essentially of a viscous fluid and from 30 to 70%, by weight, of pasty vehicle; said viscous fluid consisting essentially of, in weight percent, 25 to 80% phosphoric acid (based on a concentration of 75 to 95%), 15 to 65% of organic material selected from the group consisting of polyethers and polyimines and mixtures thereof having an atomic ratio of carbon to ether oxygen plus imine nitrogen between 1.5 and 3.1, from 0.1 to 15% of copper containing material, from 0 to 40% of ammonium salt, and from 0 to 30% water; said organic material having a molecular weight between 4,000 and 20,000.

10. A soldering flux according to claim 9, wherein said viscous fluid has 30 to 75% phosphoric acid, 20 to 60% organic material, from 0.5 to 10% of copper containing material, from 0 to 33% of ammonium salt, and from 0 to 20% water.

11. A soldering flux according to claim 10, wherein said viscous fluid has from 15 to 25% of ammonium salt.

12. A soldering flux according to claim 9, wherein said organic material has a molecular weight between 6,000 and 10,000.

13. A soldering flux according to claim 9, wherein said organic material is from the group consisting of polyethylene glycol, polypropylene glycol, methyl cellulose and polyethyleneimine.

14. A soldering flux according to claim 13, wherein said organic material is polyethylene gylcol.

15. A soldering flux according to claim 9, wherein said copper containing material is from the group consisting of copper, copper alloys and copper salts.

16. A soldering flux according to claim 15, wherein said copper containing material is basic copper carbonate.

17. A soldering flux according to claim 9, wherein said pasty vehicle is petrolatum.

18. A soldering flux according to claim 9, having from 33 to 40% of pasty vehicle.

* * * * *